(12) United States Patent
Obara

(10) Patent No.: US 6,181,513 B1
(45) Date of Patent: Jan. 30, 2001

(54) SPINDLE MOTOR AND A HARD DISK DRIVE APPARATUS INCLUDING SUCH A MOTOR

(75) Inventor: Rikuro Obara, Nagano-ken (JP)

(73) Assignee: Minebea Kabushiki-Kaisha, Nagano-ken (JP)

( * ) Notice: Under 35 U.S.C. 154(b), the term of this patent shall be extended for 0 days.

(21) Appl. No.: 09/310,943

(22) Filed: May 13, 1999

(30) Foreign Application Priority Data

May 14, 1998 (JP) .................................................. 10-130915

(51) Int. Cl.[7] .................................................... G11B 17/02
(52) U.S. Cl. ........................................................ 360/99.08
(58) Field of Search ............................ 360/99.08, 98.07; 310/90; 384/276, 615, 513, 512

(56) References Cited

U.S. PATENT DOCUMENTS

| | | | | |
|---|---|---|---|---|
| 4,713,704 | * | 12/1987 | Voll et al. | ........................ 360/97.02 |
| 5,655,846 | * | 8/1997 | Obara | ................... 384/520 |
| 5,800,069 | * | 9/1998 | Obara | ................... 384/504 |
| 5,808,388 | * | 9/1998 | Obara | ...................... 310/90 |
| 5,820,273 | * | 10/1998 | Obara | ................... 384/613 |
| 5,828,150 | * | 10/1998 | Obara | ...................... 310/90 |
| 5,841,210 | * | 11/1998 | Obara | ...................... 310/90 |
| 5,933,292 | * | 8/1999 | Obara | ............................. 360/99.08 |

FOREIGN PATENT DOCUMENTS

| | | | |
|---|---|---|---|
| 0 613 134 A1 | * | 8/1994 | (EP) . |
| 0 771 002 A2 | * | 5/1997 | (EP) . |
| 0 982 508 A2 | * | 3/2000 | (EP) . |

* cited by examiner

*Primary Examiner*—William Klimowicz

(57) ABSTRACT

A spindle motor including a double row bearing apparatus 2 for supporting a rotor hub 9 rotatably on a base 1. A labyrinth seal mechanism is incorporated into the bearing apparatus. The double row bearing apparatus includes a two-stepped shaft 3 and a pair of rows of rotating bodies 5a and 5b interposed between the shaft and a sleeve outer race 4 surrounding the shaft. A pair of inner and outer sealing plates 13a and 13b are provided between the spacing defined between the sleeve outer race and the inner race fitted around the reduced diameter portion of the shaft to form a labyrinth seal. A pair of inner and outer sealing plates 14a and 14b are also provided between the sleeve outer race and the inner race fitted around the enlarged diameter shaft portion to form a labyrinth seal. Thus, there is no necessity for the manufacturer of the motor to incorporate the additional sealing mechanism into the motor. Rather, the only necessity is to assemble the motor by employing the bearing apparatus to which the labyrinth seal mechanism or mechanisms are already incorporated by the maker of the bearing.

16 Claims, 12 Drawing Sheets

F I G. 1 (a)
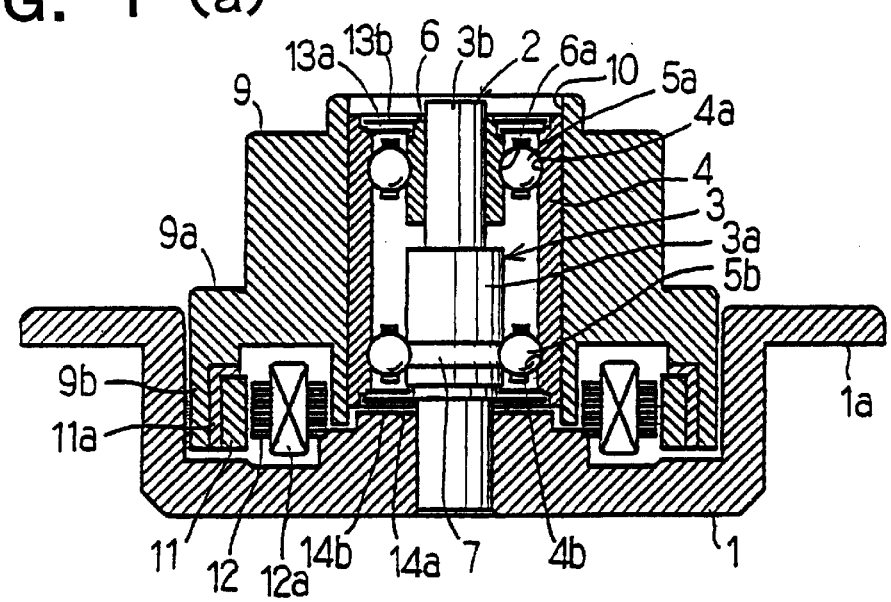
F I G. 1 (b)
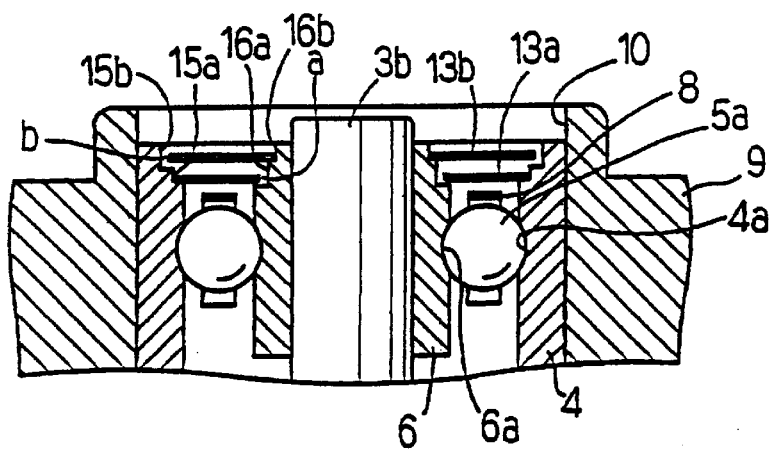
F I G. 1 (c)
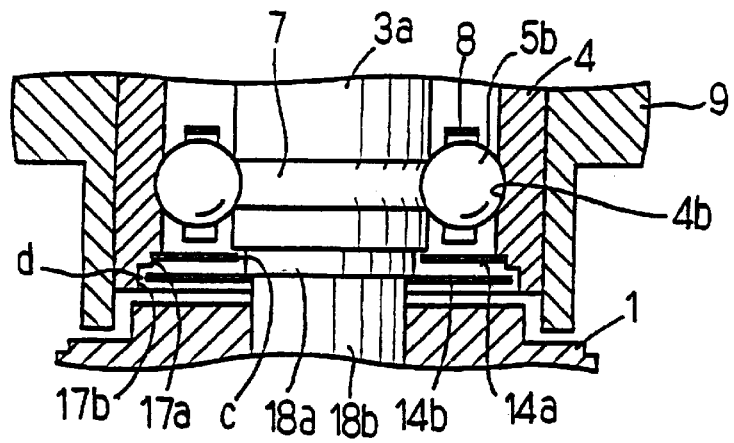

SPINDLE MOTOR AND A HARD DISK DRIVE APPARATUS INCLUDING SUCH A MOTOR

BACKGROUND OF THE INVENTION

1. Technical Field

The present invention relates in particular to a spindle motor to be used in the hard disk drive means, and a hard disk drive apparatus including such a motor.

2. Description of the Prior Art

The motor of the hard disk drive means employs grease or oil as a lubricant to be applied to the bearing.

In such kind of motors, splashing and dispersing of the lubricant from the bearing apparatus into the surrounding environment may be caused by the rotation of the motor. Further, fine dusts suspended in atmosphere is tend to get into the bearing assembly. In order to cope with such problems, some bearings has an annular sealing plate. The sealing structure of the prior art employing such annular sealing plate can be categorized into the contact type and the non-contact type.

In the case of the sealing structure of the non-contact type incorporated into the bearing apparatus, for example, the outer peripheral portion of the annular sealing plate is secured by means of adhesive to the end surface of the outer race with leaving a slight clearance between the inner peripheral portion thereof and the inner race to avoid the contact between them.

However, there is an problem of flowing the lubricant contained within the bearing out through the clearance while the motor is rotated in high speed. In the case of the motor for hard disk drive means, the lubricant flowing out through the clearance will be splashed through the clearance to make oil mist. Thus produced finely dispersed oil mist is apt to get into the disk enclosure of the hard disk drive means. These oil mist adhered on the magnetic disk or the magnetic head will cause the accidents such as the crushing of the magnetic disk and the magnetic head to reduce the reliability of the hard disk drive apparatus.

In order to prevent such accidents as mentioned above, a number of countermeasures have been taken by those skilled in the art. For example, in one of the countermeasures, the annular sealing plate is secured to the outer race around the outer peripheral portion thereof and making the inner peripheral edge thereof contact with the inner race. In such a countermeasure, not only the heat or the torque are produced by the friction between the sealing plate and the inner race, but also the wear due to friction will cause the leakage of the lubricant or produce frictional particles, so that this countermeasure can not be adopted.

Under the reason as mentioned above, the motor including the sealing structure of the non-contacting type as well as an additional labyrinth seal mechanism, or the motor having a magnetic fluid sealing mechanism within the bearing apparatus are available today. However, the additional labyrinth seal mechanism will increase the production cost for manufacturing the motor. When the magnetic fluid is employed to seal, the magnetic fluid is tend to shift radially outwardly under the effect of centrifugal force. Further, the magnetic fluid sometimes splashes under the effect of locally effected differential of air pressure. In conclusion neither of these structure is appropriate to the motor for hard disk drive apparatus. In particular, the additional labyrinth seal mechanism is to be employed, the manufacturer of the motor is required to incorporate such labyrinth seal mechanism into the motor, so that the production cost of the motor is increased.

Accordingly, the object of the present invention is to provide a motor suitable for the hard disk drive apparatus including a labyrinth seal mechanism incorporated into the bearing means to increase the sealing function of the sealing structure of non-contact type to provide a sufficient and reliable sealing function and a hard disk drive apparatus of increased reliability. It is only necessary for the manufacturer of the motor to assemble the motor with the bearing means into which a labyrinth seal mechanism had already been incorporated by the manufacturer of the bearing so that the production cost of the motor can be reduced.

SUMMARY OF THE INVENTION

Those and other objects are achieved by a motor including a double row bearing apparatus for supporting a rotor hub rotatably on a base characterized in that: the double row bearing apparatus includes; a two-stepped shaft having an enlarged diameter shaft portion and a reduced shaft portion, a sleeve outer race disposed around the shaft through a pair of first and second rows of rotating bodies interposed between the shaft and the sleeve, rotating bodies for the first row is adapted to be interposed between an outer peripheral rolling contact groove formed directly on the outer peripheral surface of the enlarged diameter shaft portion of the stopped shaft and a first inner peripheral rolling contact groove formed on the inner peripheral surface of the sleeve outer race, rotating bodies for the second row is adapted to be interposed between am outer peripheral rolling contact groove formed on an outer peripheral surface of an inner race fitted around the reduced diameter shaft portion of the stepped shaft and a second inner peripheral rolling contact groove formed on the inner peripheral surface of the sleeve outer race, at the side of the first row of the rotating bodies, a pair of inner and outer annular sealing plates are provided to leave a slight clearance between the inner or outer peripheral surface of each sealing plate and the outer peripheral surface of the enlarged diameter shaft portion or the end portion of the sleeve outer race to provide a labyrinth seal on one side of the sleeve outer race, and at the side of the second row of rotating bodies, a pair of inner and outer annular sealing plates are provided to leave a slight clearance between the inner or outer peripheral surface of each sealing plate and the inner race or the end portion of the sleeve outer race to provide a labyrinth seal on the other side of the sleeve outer race.

In the other embodiment of the present invention, at the side of said first row of the rotating bodies, inner and outer shoulders are formed on the end portion of the sleeve outer race in a two-stepped manner, and inner and outer shoulders are also provided on the outer peripheral surface of the enlarged diameter shaft portion of the stepped shaft in the same manner so as to opposite to the inner and outer shoulders of the sleeve outer race, said inner sealing plate is attached to either of said inner shoulder of the sleeve or the shaft with remaining a slight clearance between the plate and the shaft or the sleeve to provide the labyrinth seal function, and said outer sealing plate is attached to either of said outer shoulder of the sleeve or the shaft with remaining a slight clearance between the plate and the shaft or the sleeve to provide the labyrinth seal function.

In the other embodiment of the present invention, at the side of said second row of the rotating bodies, inner and outer shoulders may be provided on he end surface of the sleeve outer race in a two-stepped manner, and inner and outer shoulders may also be provided on the end portion of the inner race in the same manner so as to opposite to the inner and outer shoulders of the sleeve outer race, said inner sealing plate may be attached to said inner shoulder of either of the sleeve outer race or the inner race with remaining a slight clearance between the plate and the inner race or the sleeve outer race to provide the labyrinth seal function, and said outer sealing plate may be attached to said outer shoulder of either of the sleeve outer race or the inner race with remaining a slight clearance between the plate and the inner race of the sleeve outer race to provide a labyrinth seal.

In the further embodiment of the present invention, at the side of said first row of the rotating bodies, a one step shoulder is formed on the end surface of the sleeve outer race, and inner shoulder is provided on the outer peripheral surface of the enlarged diameter shaft portion of said stepped shaft to opposite to the shoulder of the sleeve outer race, an outer shoulder is also provided on the shaft to form it a two stepped shaft, said inner sealing plate is attached to either of said shoulder of the sleeve or the inner shoulder of the shaft with remaining a slight clearance between the plate and the shaft or the sleeve to provide the labyrinth seal function, and said outer sealing plate is attached to said outer shoulder with remaining a slight axial clearance between the plate and the end surface of the sleeve outer race to provide the labyrinth seal function.

In the another embodiment of the present invention, at the side of said second row of the rotating bodies, inner and outer shoulders are formed on the end surface of the sleeve outer race in a two-stepped manner, and a one step shoulder is also formed on the end portion of the inner race so as to opposite to the inner shoulder of the sleeve outer race, said inner sealing plate is attached to either of said inner shoulder of the sleeve outer race or the shoulder of the inner race with remaining a slight clearance between the plate and the inner race or the sleeve outer race to provide the labyrinth seal function, and said outer sealing plate is attached to said outer shoulder of the sleeve with remaining a slight axial clearance between the plate and the end surface of the inner race to provide the labyrinth seal function.

In the yet another embodiment of the present invention, at the side of said second row of the rotating bodies, a shoulder is provided on the end surface of the sleeve outer race, and inner shoulder is provided on the end portion of the inner race to opposite to the shoulder of the sleeve outer race, an outer shoulder is also provided on the inner race to form a two-stepped shoulder, said inner sealing plate is attached to either of said shoulder of the sleeve or the inner shoulder of the inner race with remaining a slight clearance between the plate and either of the inner race or the sleeve to provide the labyrinth seal function, and said outer sealing plate is attached to said outer shoulder of the inner race with remaining a slight axial clearance between the plate and the end surface of the sleeve outer race to provide the labyrinth seal function.

The stopped shaft of said double row bearing apparatus is secured to said base to extending vertically therefrom, and a vertically extending bore of the rotor hub is fitted around the sleeve outer race.

A vertically extending cylindrical portion including a through bore is provided on the central portion of the base, the sleeve outer race of said double row bearing apparatus is fitted into the bore, and the stepped shaft of said double row bearing apparatus is fitted into a vertical bore provided through the central portion of the rotor hub.

Alternatively, a hard disk drive apparatus comprising: a motor including a double row bearing apparatus for supporting a rotor hub rotatably on a base, a magnetic disk loaded on the outer peripheral surface the rotor hub, a magnetic head for writing or reading magnetic datum onto or from the magnetic disk, a positioning mechanism for moving the head to bring it to the required radial position on the disk and stopped thereabove the double row bearing apparatus of the motor including; a two-stepped shaft having an enlarged diameter shaft portion and a reduced shaft portion, a sleeve outer race disposed around the shaft through a pair of first and second rows of rotating bodies interposed between the shaft and the sleeve, rotating bodies for the first row is adapted to be interposed between an outer peripheral rolling contact groove formed directly on the outer peripheral surface of the enlarged diameter shaft portion of the stepped shaft and a first inner peripheral rolling contact groove formed on the inner peripheral surface of the sleeve outer race, rotating bodies for the second row is adapted to be interposed between an an outer peripheral rolling contact groove formed on an outer peripheral surface of an inner race fitted around the reduced diameter shaft portion of the stepped shaft and a second inner peripheral rolling contact groove formed on the inner peripheral surface of the sleeve outer race, at the side of the first row of the rotating bodies, a pair of inner and outer annular sealing plates are provided to leave a slight clearance between the inner or outer peripheral surface of each sealing plate and the outer peripheral surface of the enlarged diameter shaft portion or the end portion of the sleeve outer race to provide a labyrinth seal on one side of the sleeve outer race, and at the side of the second row of rotating bodies, a pair of inner and outer annular sealing plates are provided to leave a slight clearance between the inner or outer peripheral surface of each sealing plate and the inner race or the end portion of the sleeve outer race to provide a labyrinth seal on the other side of the sleeve outer race.

In the other embodiment of the hard disk drive apparatus of the present invention, the double row bearing apparatus of the motor including at the side of said first row of the rotating bodies, inner and outer shoulders formed on the end portion of the sleeve outer race in a two-stepped manner, and inner and outer shoulders provided also on the outer peripheral surface of the enlarged diameter shaft portion of the stepped shaft in the same manner so as to opposite to the inner and outer shoulders of the sleeve outer race, wherein said inner sealing plate is attached to either of said inner shoulder of the sleeve or the shaft with remaining a slight clearance between the plate and the shaft or the sleeve to provide the labyrinth seal function, and said outer sealing plate is attached to either of said outer shoulder of the sleeve or the shaft with remaining a slight clearance between the plate and the shaft or the sleeve to provide the labyrinth seal function.

In the other embodiment of the hard disk drive apparatus of the present invention, the double row bearing apparatus of the motor including at the side of said second row of the rotating bodies, inner and outer shoulders provided on the end surface of the sleeve outer race in a two-stepped manner, and inner and outer shoulders provided also on the end portion of the inner race in the same manner so as to opposite to the inner and outer shoulders of the sleeve outer race, wherein said inner sealing plate is attached to said inner shoulder of either of the sleeve outer race or the inner race with remaining a slight clearance between the plate and the inner race or the sleeve outer race to provide the labyrinth seal function, and said outer sealing plate is attached to said outer shoulder of either of the sleeve outer race or the inner race with remaining a slight clearance between the plate and the inner race or the sleeve outer race to provide a labyrinth seal.

In the other embodiment of the hard disk drive apparatus of the present invention, the double row boaring apparatus of the motor including at the side of said first row of the rotating bodies, a one step shoulder formed on the end surface of the sleeve outer race, and inner shoulder provided on the outer peripheral surface of the enlarged diameter shaft portion of said stepped shaft to opposite to the shoulder of the sleeve outer race, an outer shoulder provided also on the shaft to form it a two stepped shaft, wherein said inner sealing plate is attached to either of said shoulder of the sleeve or the inner shoulder of the shaft with remaining a slight clearance between the plate and the shaft or the sleeve to provide the labyrinth seal function, and said outer sealing plate is attached to said outer shoulder with remaining a slight axial clearance between the plate and the end surface of the sleeve outer race to provide the labyrinth seal function.

In the other embodiment of the hard disk drive apparatus of the present invention, the double row bearing apparatus of the motor including at the side of said second row of the rotating bodies, inner and outer shoulders formed on the end surface of the sleeve outer race in a two-stepped manner, and a one step shoulder formed also on the end portion of the inner race so as to opposite to the inner shoulder of the sleeve outer race, wherein said inner sealing plate is attached to either of said inner shoulder of the sleeve outer race or the shoulder of the inner race with remaining a slight clearance between the plate and the inner race or the sleeve outer race to provide the labyrinth seal function, and said outer sealing plate is attached to said outer shoulder of the sleeve with remaining a slight axial clearance between the plate and the end surface of the inner race to provide the labyrinth seal function.

In the other embodiment of the hard disk drive apparatus of the present invention, the double row bearing apparatus of the motor including at the side of said second row of the rotating bodies, a shoulder provided on the end surface of the sleeve outer race, and inner shoulder provided on the end portion of the inner race to opposite to the shoulder of the sleeve outer race, an outer shoulder provided also on the inner race to form a two-stepped shoulder, wherein said inner sealing plate is attached to either of said shoulder of the sleeve or the inner shoulder of the inner race with remaining a slight clearance between the plate and either of the inner race or the sleeve to provide the labyrinth seal function, and said outer sealing plate is attached to said outer shoulder of the inner race with remaining a slight axial clearance between the plate and the end surface of the sleeve outer race to provide the labyrinth seal function.

The double row bearing apparatus of the motor may include the stepped shaft secured to said base to extending vertically therefrom. The vertically extending bore of the rotor hub is adapted to be fitted around the sleeve outer race.

The motor of the hard disk drive apparatus has a base the central portion of which is provided with a cylindrical portion including a through bore, the sleeve outer race of said double row bearing apparatus is fitted into the bore, and the stepped shaft of said double row bearing apparatus is fitted into a vertical bore provided through the central portion of the rotor hub.

BRIEF DESCRIPTION OF THE DRAWINGS

Further feature of the present invention will become apparent to those skilled in the art to which the present invention relates from reading the following specification with reference to the accompanying drawings, in which:

FIG. 1 is a view showing a motor of the first embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor;

DETAILED DESCRIPTION OF THE PRESENT INVENTION

The First Embodiment of the Invention

Figure 2:
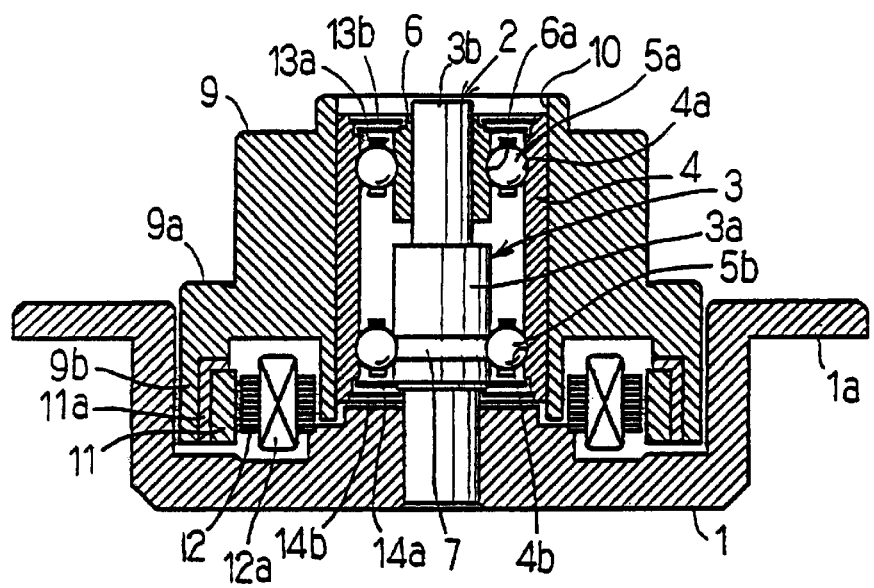
FIG. 2 is a view showing a motor of the second embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 2:
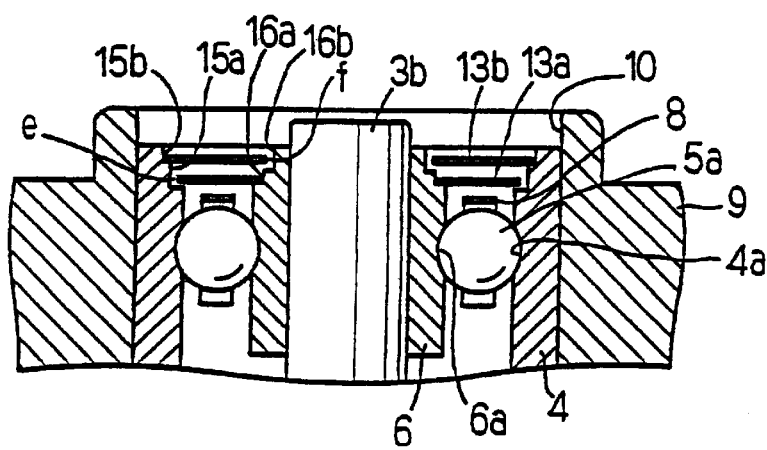
Figure 2:
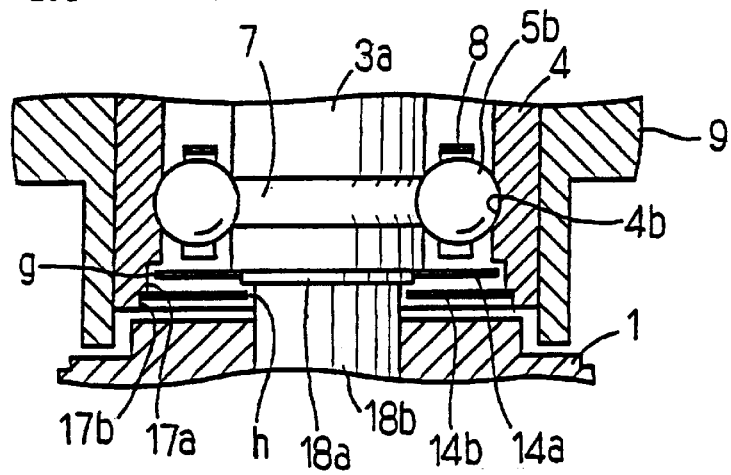

The first embodiment of the motor of the present invention will now be described with reference to FIGS. 1*a*, 1*b* and 1c. The motor of this embodiment is of a fixed shaft type that the shaft 3 of the double row bearing apparatus 2 is secured to the base 1 having a flange 1a. The shaft 3 is a stepped shaft including enlarged and reduced diameter shaft portions 3a and 3b on the lower and upper end thereof respectively. A sleeve outer race 4 is supported by the shaft through a pair of upper and lower rows of balls 5a and 5b interposed as rotating bodies between the shaft and the sleeve.

The sleeve outer race 4 is provided on its inner peripheral surface a pair of upper and lower rolling contact grooves 4a and 4b. The upper balls 5a i.e. rotating bodies of the first row is adapted to be interposed between a rolling contact groove 6a formed on an inner race 6 fitted on the reduced diameter shaft portion 3b and the upper rolling contact groove 4a i.e. the first rolling contact groove of the sleeve outer race. The lower balls 5a i.e. rotating bodies of the second row is adapted to be interposed between the outer peripheral rolling contact groove 7 formed directly on the outer peripheral surface of the enlarged diameter shaft portion 3a and the lower rolling contact groove 4b i.e. the second rolling contact groove of the sleeve outer race. Balls 5a and 5b are adapted to be retained by means of ball retainers 8.

The outer diameter of the enlarged shaft portion 3a and that of the inner race 6 fitted around the reduced diameter shaft portion 3b are identical with each other, so that the balls of the same diameter can be employed as upper and lower balls 5a, 5b.

A rotor hub 9 has a vertically extending bore 10 within which the sleeve outer race 4 is fitted so as to rotatably support the rotor hub 9. An outer peripheral portion of the rotor hub 9 is provided with an support portion 9a on which a magnetic disc is to be loaded and a downwardly depending flange 9b.

A magnet 11 is attached through a magnet holder 11a to an inner surface of the flange 9b. An inner peripheral surface of the magnet is faced against the outer peripheral surface of a stator 12 around which a coil 12a is wounded. A slight clearance is left between them.

In the spindle motor according to the present invention, the spacing defined between the upper end of the sleeve outer race 4 mounted around the reduced diameter shaft portion 3b and the inner race 6 is sealed by means of a pair of annular sealing plates 13a and 13b, and the spacing defined between the the lower end of the sleeve outer race 4 and the outer peripheral surface of the enlarged diameter shaft portion is also sealed at the side of enlarged diameter shaft portion by means of a pair of annular sealing plates 14a and 14b in the same fashion.

As can be seen from FIG. 1b, at the side of reduced diameter shaft portion 3b, a pair of shoulders 15a, 15b are formed on the upper end of the sleeve outer race 4 in a two-stepped manner, and a pair of shoulders 16a, 16b are formed on the upper end of the inner race 6 in the same manner. The outer peripheral portion of the inner sealing plate 13a is secured with adhesive on the end surface of the inner shoulder 15a with remaining a slight clearance (a) between the inner peripheral surface thereof and the outer peripheral surface of the inner shoulder 16a to avoid the contact between them to provide the labyrinth seal function.

The inner peripheral portion of the outer sealing plate 13b is secured with adhesive on the outer peripheral surface of the outer shoulder 16b of the inner race 6 with remaining a slight clearance (b) between the outer peripheral surface thereof and the outer shoulder 15b of the sleeve outer race to avoid the contact between them to provide the labyrinth seal function.

As can be seen from FIG. 1c, at the side of enlarged diameter shaft portion 3a, a pair of shoulders 17a, 17b are formed on the lower end of the sleeve outer race 4 in a two-stepped manner, and a pair of shoulders 18a, 18b are formed on the outer peripheral portion of the enlarged diameter shaft portion 3a in the same manner. The outer peripheral portion of the inner sealing plate 14a is secured with adhesive on the end surface of the inner shoulder 17a with remaining a slight clearance (c) between the inner peripheral surface thereof and the outer peripheral surface of the inner shoulder 18a to avoid the contact between them to provide the labyrinth seal function.

The inner peripheral portion of the outer sealing plate 14b is secured with adhesive on the outer peripheral surface of the outer shoulder 18b of the enlarged diameter shaft portion 3a with remaining a slight clearance (d) between the outer peripheral surface thereof and the outer shoulder 17b of the sleeve outer race 4 to avoid the contact between them to provide the labyrinth seal function.

Upon assembling the double row bearing apparatus, lower row of balls 5b are interposed between the outer peripheral rolling contact groove 7 of the enlarged diameter shaft portion 3a of the shaft 3 and the inner peripheral rolling contact groove 4b of the sleeve outer race 4, the inner race 6 is fitted slidably around the reduced diameter shaft portion 3b of the shaft 3, upper row of balls 5a are interposed between the outer peripheral rolling contact groove 6a of the inner race 6 and the inner peripheral rolling contact groove 4a of the sleeve outer race 4, and the inner race 6 is secured to the reduced diameter shaft portion 3b by means of adhesive with applying thereto an appropriate pre-pressure on the upper end surface of the inner race 6, and then the sealing plates are incorporated.

Although in the above mentioned first embodiment, the fixing of the sealing plates are adapted to be achieved by means of adhesive, the inner sealing plate 13a can be press fitted within the recess defined by the inner shoulder 15a of the sleeve outer race 4, the outer sealing plate 13b can be press fitted around the outer shoulder 16b of the inner race 6, the inner sealing plate 14a can be press fitted within the recess defined by the inner shoulder 17a of the sleeve outer race 4, and the outer sealing plate 14b can be press fitted around the outer shoulder 18b of the enlarged diameter shaft portion 3a.

The Second Embodiment of the Invention

The second embodiment of the present invention will now be described with reference to FIGS. 2a, 2b and 2c. The second embodiment is substantially the same in its rotational mechanism as that of the first embodiment. However, the structure of the seal of the second embodiment is essentially different from that described above with respect to the first embodiment of the invention.

As can be seen from FIG. 2b, at the side of reduced diameter shaft portion 3b, the inner peripheral portion of the inner sealing plate 13a is secured with adhesive on the outer peripheral surface of the inner shoulder 16a of the inner race 6 with remaining a slight clearance (e) between the outer peripheral surface thereof and the inner peripheral surface of the inner shoulder 15a of the sleeve outer race 4 to avoid the contact between them to provide the labyrinth seal function.

The outer peripheral portion of the outer sealing plate 13b is secured with adhesive on the outer shoulder 15b of the sleeve outer race 4 with remaining a slight clearance (f) between the inner peripheral portion thereof and the outer peripheral surface of the outer shoulder 16b of the inner race 6 to avoid the contact between them to provide the labyrinth seal function.

As can be seen from FIG. 2c, at the side of enlarged diameter shaft portion 3a, the inner peripheral portion of the inner sealing plate 14a is secured with adhesive on the outer peripheral surface of the inner shoulder 18a of the enlarged diameter shaft portion 3a, with remaining a slight clearance (g) between the inner peripheral surface thereof and the inner shoulder 17a of the sleeve outer race 4 to avoid the contact between them to provide the labyrinth seal function.

The outer peripheral portion of the outer sealing plate 14b is secured with adhesive on the inner peripheral surface of the outer shoulder 17b of the sleeve outer race 4 with remaining a slight clearance (h) between the inner peripheral portion thereof and the outer peripheral surface of the outer shoulder 18b of the enlarged diameter shaft portion 3a to avoid the contact between them to provide the labyrinth seal function.

Although in the above-mentioned second embodiment, the fixing of the sealing plates are adapted to be effected by means of adhesive, the inner sealing plate 13a can be press fitted around the inner shoulder 16a of the inner race 6, the outer sealing plate 13b can be press fitted within the recess defined by the outer shoulder 15b of the sleeve outer race 4, the inner sealing plate 14a can be press fitted around the inner shoulder 18a of the enlarged diameter shaft portion 3a, and the outer sealing plate 14b can be press fitted within the recess defined by the outer shoulder 17b of the sleeve outer race 4.

The Third Embodiment of the Invention

The third embodiment of the present invention will now be described with reference to FIGS. 3a, 3b and 3c. As can be seen from FIG. 3b, at the side of reduced diameter shaft portion 3b, the outer peripheral portion of the inner sealing plate 13a is secured with adhesive on the end surface of the inner shoulder 15a of the sleeve outer race 4 with remaining a slight clearance (a) between the inner peripheral surface thereof and the outer peripheral surface of the inner shoulder 16a of the inner race 6 to avoid the contact between them to provide the labyrinth seal function.

The outer peripheral portion of the outer sealing plate 13b is secured with adhesive on the outer shoulder 15b of the sleeve outer race 4 with remaining a slight clearance (f) between the inner peripheral portion thereof and the outer peripheral surface of the outer shoulder 16b of the inner race 6 to avoid the contact between them to provide the labyrinth seal function.

Figure 3:
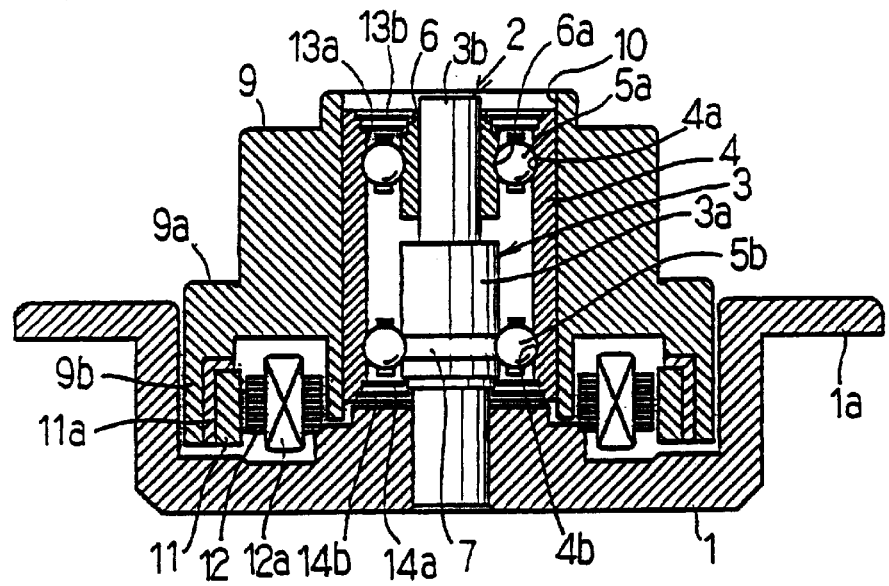
FIG. 3 is a view showing a motor of the third embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 3:
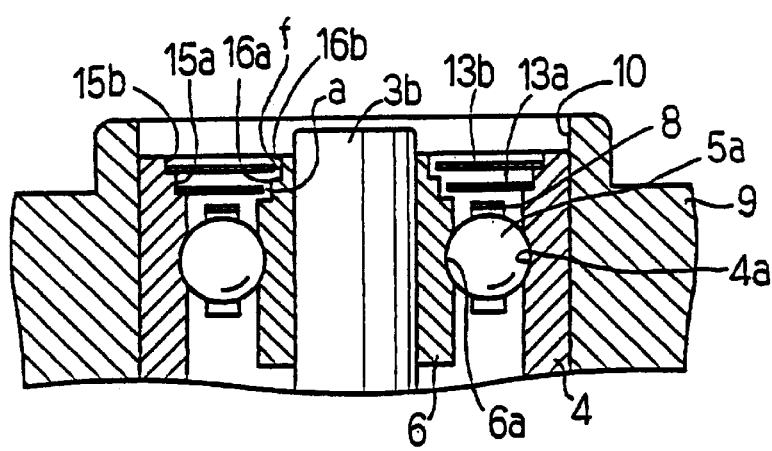
Figure 3:
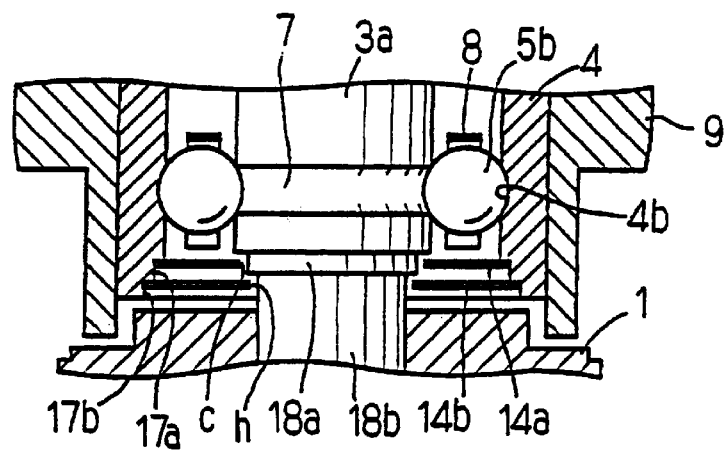

As can be seen from FIG. 3c, at the side of the enlarged diameter shaft portion 3a, the outer peripheral portion of the inner sealing plate 14a is secured with adhesive on the end surface of the inner shoulder 17a of sleeve outer race 4 with remaining a slight clearance (c) between the inner peripheral portion thereof and the outer peripheral surface of the inner shoulder 18a of the enlarged diameter shaft portion 3a to avoid the contact between them to provide the labyrinth seal function.

The outer peripheral portion of the outer sealing plate 14b is secured with adhesive on the outer shoulder 17b of the sleeve outer race 4 with remaining a slight clearance (h) between the inner peripheral portion thereof and the outer peripheral surface of the outer shoulder 18b of the enlarged diameter shaft portion 3a to avoid the contact between them to provide the labyrinth seal function.

Although in the above-mentioned third embodiment, the fixing of the sealing plates are adapted to be effected by means of adhesive, the inner sealing plate 13a can be press fitted within the recess defined by the inner shoulder 15a of the sleeve outer race 4, the outer sealing plate 13b can be press fitted within the recess defined by the outer shoulder 15b of the sleeve outer race 4, the inner sealing plate 14a can be press fitted within the recess defined by the inner shoulder 17a of the sleeve outer race 4, and the outer sealing plate 14b can be press fitted within the recess defined by the outer shoulder 17b of the sleeve outer race 4.

The Fourth Embodiment of the Invention

The fourth embodiment of the present invention will now be described with reference to FIGS. 4a, 4b and 4c. As can be seen from FIG. 4b, at the side of reduced diameter shaft portion 3b, the inner peripheral portion of the inner sealing plate 13a is secured with adhesive on the outer peripheral surface of the inner shoulder 16a of the inner race 6 with remaining a slight clearance (e) between the outer peripheral surface thereof and the inner shoulder 15a of the sleeve outer race 4 to avoid the contact between them to provide the labyrinth seal function.

The inner peripheral portion of the outer sealing plate 13b is secured with adhesive on the outer peripheral surface of the outer shoulder 16b of the inner race 6 with remaining a slight clearance (b) between the outer peripheral portion thereof and the outer shoulder 15b of the sleeve outer race 4 to avoid the contact between them to provide the labyrinth seal function.

Figure 4:
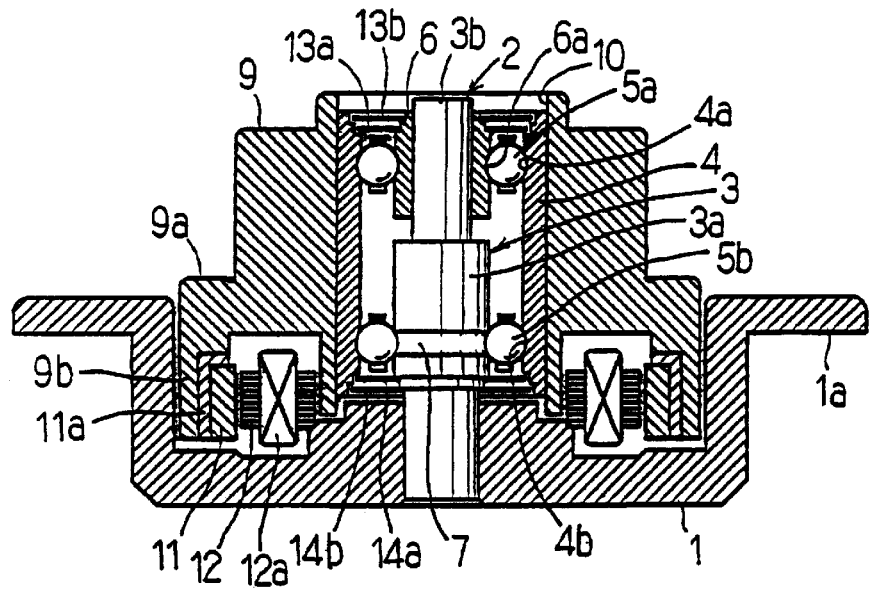
FIG. 4 is a view showing a motor of the fourth embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 4:
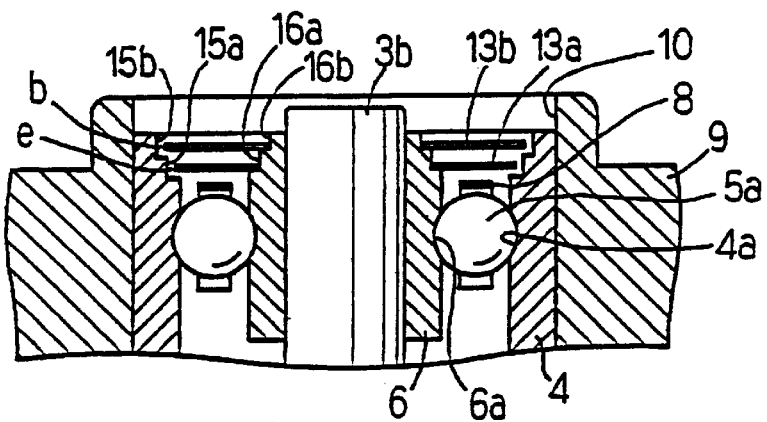
Figure 4:
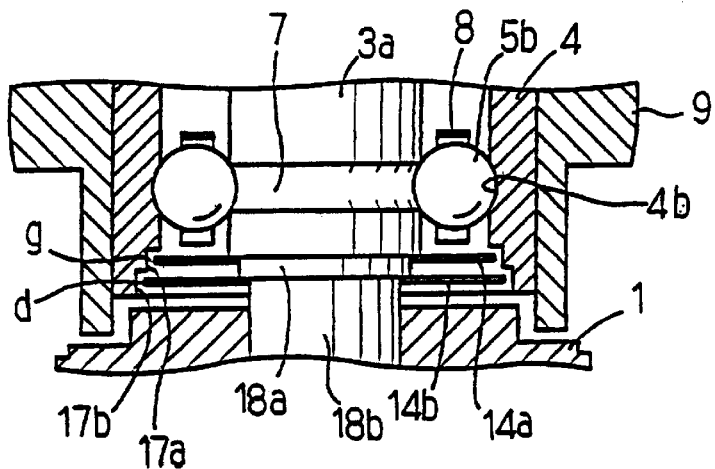

As can be seen from FIG. 4c, at the side of enlarged diameter shaft portion 3a, the inner peripheral portion of the inner sealing plate 14a is secured with adhesive on the outer peripheral surface of the inner shoulder 18a of the enlarged diameter shaft portion 3a, with remaining a slight clearance (g) between the outer peripheral portion thereof and the inner shoulder 17a of sleeve outer race 4 to avoid the contact between them to provide the labyrinth seal function.

The inner peripheral portion of the outer sealing plate 14b is secured with adhesive on the outer peripheral surface of the outer shoulder 18b of the enlarged diameter shaft portion 3a with remaining a slight clearance (d) between the outer peripheral portion thereof and the outer shoulder 17b of the sleeve outer race 4 to avoid the contact between them to provide the labyrinth seal function.

Although in the above-mentioned fourth embodiment, the fixing of the sealing plates are adapted to be effected by means of adhesive, the inner sealing plate 13a can be press fitted around the inner shoulder 16a of the inner race 6, the outer sealing plate 13b can be press fitted around the outer shoulder 16b of the inner race 6, the inner sealing plate 14a can be press fitted around the inner shoulder 18a of the enlarged diameter shaft portion 3a, and the outer sealing plate 14b can be press fitted around the outer shoulder 18b of the enlarged diameter shaft portion 3a.

The Fifth Embodiment of the Invention

The fifth embodiment of the present invention will now be described with reference to FIGS. 5a, 5b and 5c. As can be seen from FIG. 5b, the motor in accordance with the fifth embodiment is different from those described in the first to the fourth embodiments in the structure of the inner race 6 and outer sealing plate 13b provided on the side of reduced diameter shaft portion 3b.

In the structure of this embodiment, the inner race 6 has only one reduced diameter shoulder portion 16c, and an inner peripheral surface of an inner sealing plate 13a is secured with adhesive on the end surface of the shoulder 16c with remaining a slight clearance (e) between the outer peripheral portion thereof and the inner shoulder 15a of the sleeve outer race 4 to avoid the contact between them to provide the labyrinth seal function.

The outer sealing plate 13b has an inner peripheral edge of a diameter slightly larger than that of the bore of the inner ring 6 or that of the reduced diameter shaft portion 3b. The outer peripheral portion of the sealing plate 13b is secured with adhesive on the end surface of the outer shoulder 15b of the sleeve outer race 4 with remaining a slight clearance (j) between the inner peripheral portion thereof and the outer peripheral surface of the reduced diameter shaft portion 3b and with remaining a slight axial clearance (k) between the lower surface through the plate and the upper end surface of the inner race 6 to avoid the contact between them to provide the labyrinth seal function.

Figure 5:
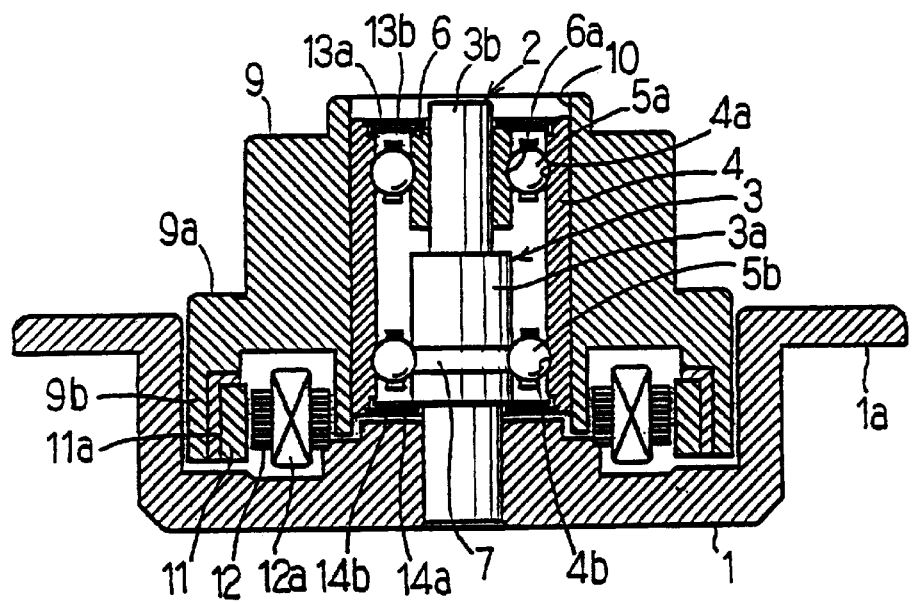
FIG. 5 is a view showing a motor of the fifth embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 5:
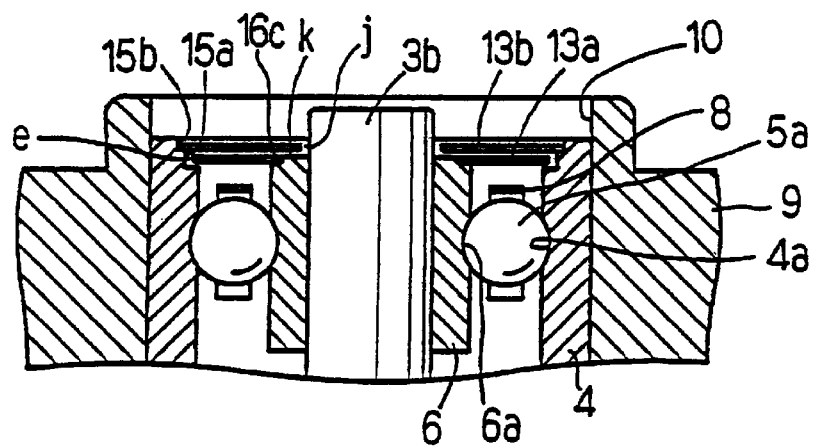
Figure 5:
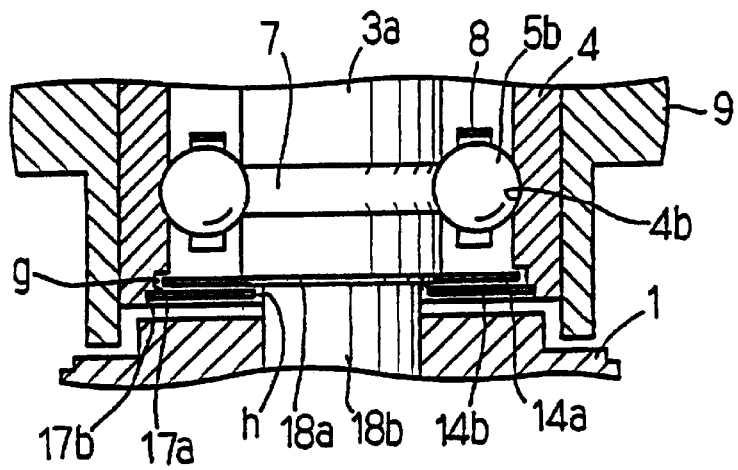

As can be seen from FIG. 5c, at the side of enlarged diameter shaft portion 3a, the inner peripheral portion of the inner sealing plate 14a is secured with adhesive on the outer peripheral surface of the inner shoulder 18a of the enlarged diameter shaft portion 3a, with remaining a slight clearance (g) between the outer peripheral portion thereof and the inner shoulder 17a of the sleeve outer race 4 to avoid the contact between them to provide the labyrinth seal function.

The outer peripheral portion of the outer sealing plate 14b is secured with adhesive on the outer shoulder 17b of the sleeve outer race 4 with remaining a slight clearance (h) between the inner peripheral portion thereof and the outer peripheral surface of the outer shoulder 18b of the enlarged diameter shaft portion 3a to avoid the contact between them to provide the labyrinth seal function.

Although in the above-mentioned fifth embodiment, the fixing of the sealing plates are adapted to be effected by means of adhesive, the inner sealing plate 13a can be press fitted around the inner shoulder 16c of the inner race 6, the outer sealing plate 13b can be press fitted within the recess defined by the outer shoulder 15b of the sleeve outer race 4, the inner sealing plate 14a can be press fitted around the inner shoulder 18a of the enlarged diameter shaft portion 3a, and the outer sealing plate 14b can be press fitted within the recess defined by the outer shoulder 17b of the sleeve outer race 4.

The Sixth Embodiment of the Invention

The sixth embodiment of the present invention will now be described with reference to FIGS. 6a, 6b and 6c. As can be seen from FIG. 6b, at the side of reduced diameter shaft portion 3b, the outer peripheral portion of the inner sealing plate 13a is secured with adhesive on the inner shoulder 15a of the sleeve outer race 4 with remaining a slight clearance (a) between the inner peripheral portion thereof and the inner shoulder 16c of the inner race 6 to avoid the contact between them to provide the labyrinth seal function.

The outer peripheral portion of the outer sealing plate 13b is secured with adhesive on the end surface of the outer shoulder 15b of the sleeve outer race 4 with remaining a slight clearance (j) between the inner peripheral portion thereof and the outer peripheral surface of the reduced diameter shaft portion 3b and with remaining a slight axial clearance (k) between the lower surface thereof and the upper surface of the inner race 6 to avoid the contact between them to provide the labyrinth seal function.

Figure 6:
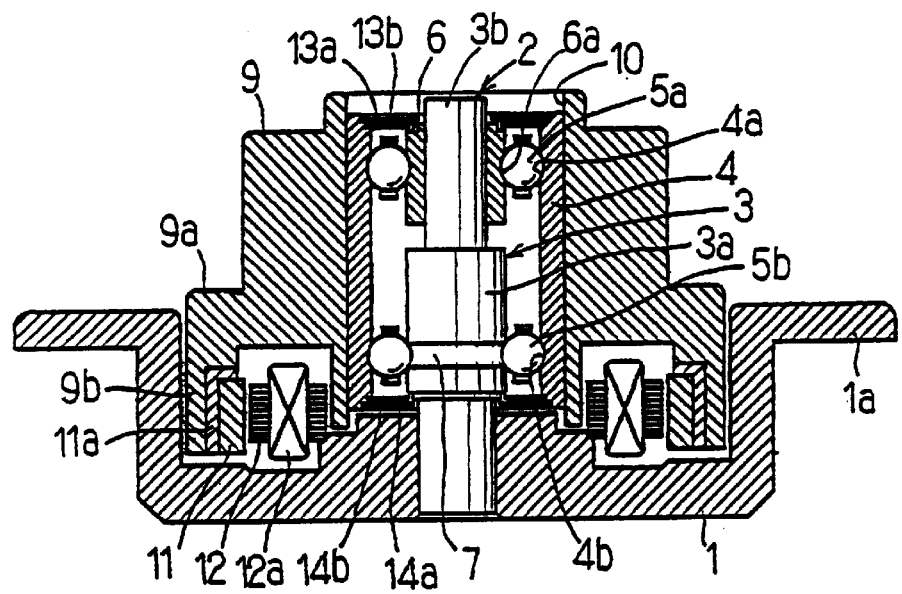
FIG. 6 is a view showing a motor of the sixth embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 6:
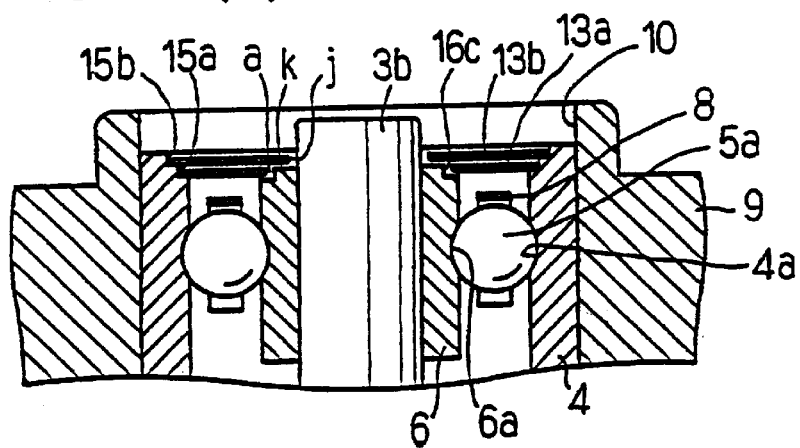
Figure 6:
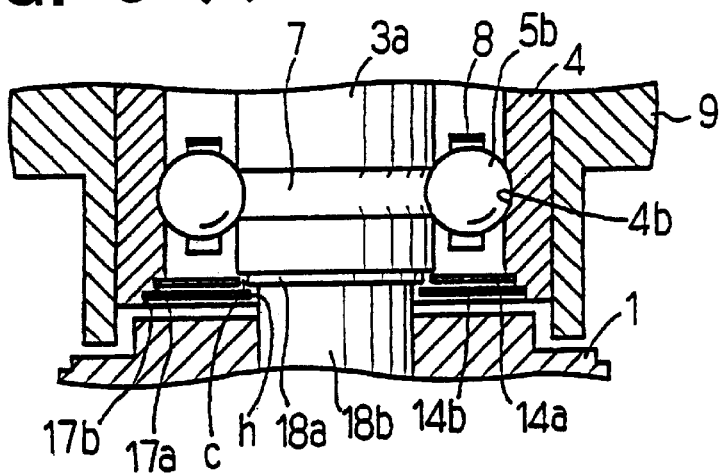

As can be seen from FIG. 6c, at the side of the enlarged diameter shaft portion 3a, the outer peripheral portion of the inner sealing plate 14a is secured with adhesive on the end surface of the inner shoulder 17a of sleeve outer race 4 with remaining a slight clearance (c) between the inner peripheral portion thereof and the outer peripheral surface of the inner shoulder 18a of the enlarged diameter shaft portion 3a to avoid the contact between them to provide the labyrinth seal function.

The outer peripheral portion of the outer sealing plate 14b is secured with adhesive on the outer shoulder 17b of the sleeve outer race 4 with remaining a slight clearance (h) between the inner peripheral portion thereof and the outer peripheral surface of the outer shoulder 18b of the enlarged diameter shaft portion 3a to avoid the contact between them to provide the labyrinth seal function.

Although in the above-mentioned sixth embodiment, the fixing of the sealing plates are adapted to be effected by means of adhesive, the inner sealing plate 13a can be press fitted within the recess defined by the inner shoulder 15a of the sleeve outer race 4, the outer sealing plate 13b can be press fitted within the recess defined by the outer shoulder 15b of the sleeve outer race 4, the inner sealing plate 14a can be press fitted within the recess defined by the inner shoulder 17a of the sleeve outer race 4, and the outer sealing plate 14b can be press fitted within the recess defined by the outer shoulder 17b of the sleeve outer race 4.

The Seventh Embodiment of the Invention

The seventh embodiment of the present invention will now be described with reference to FIGS. 7a, 7b and 7c. The seventh embodiment is different from those described in the first to the sixth embodiments in the structure of the sleeve outer race 4 and outer sealing plates 13b, 14b.

In other words, the sleeve outer race 4 has shoulders 15c and 17c provided on each of the upper and lower ends thereof respectively. The outer sealing plates 13b and 14b has an outer diameter slightly smaller than that of the sleeve outer race 4.

The outer peripheral portion of the inner sealing plate 13a is secured with adhesive to the end surface of the shoulder 15c of the sleeve outer race 4 with remaining a slight clearance (a) between the inner peripheral portion thereof and the outer peripheral surface of the inner shoulder 16a of the inner race 6 to avoid the contact between them to provide the labyrinth seal function.

The inner peripheral portion of the outer sealing plate 13b is secured with adhesive on the outer peripheral surface of the outer shoulder 16b of the inner race 6 with remaining a slight clearance (p) between the outer peripheral portion thereof and the inner peripheral surface of the through bore 10 of the rotor hub 9 and with remaining a slight axial clearance (q) between the lower surface thereof and the upper end surface of the sleeve outer race 4 to avoid the contact between them to provide the labyrinth seal function.

Figure 7:
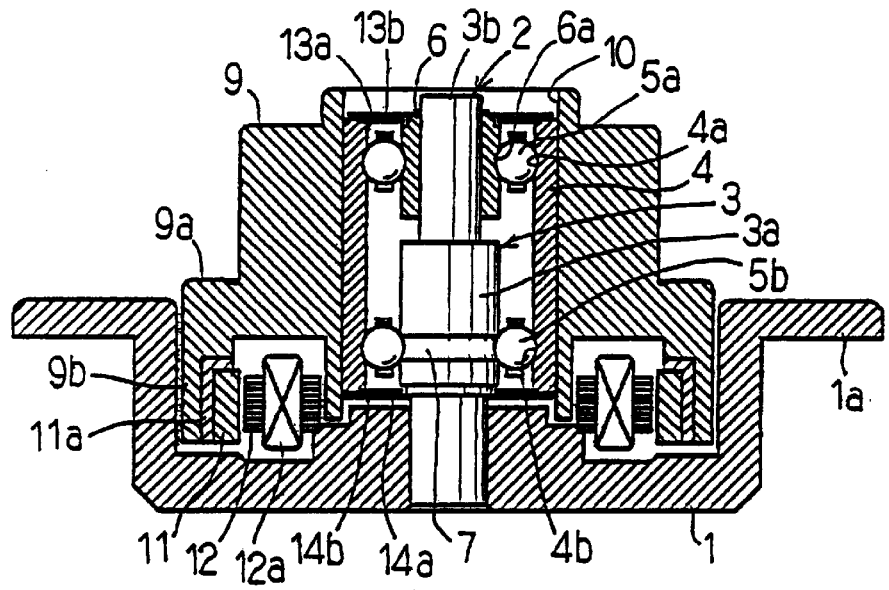
FIG. 7 is a view showing a motor of the seventh embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 7:
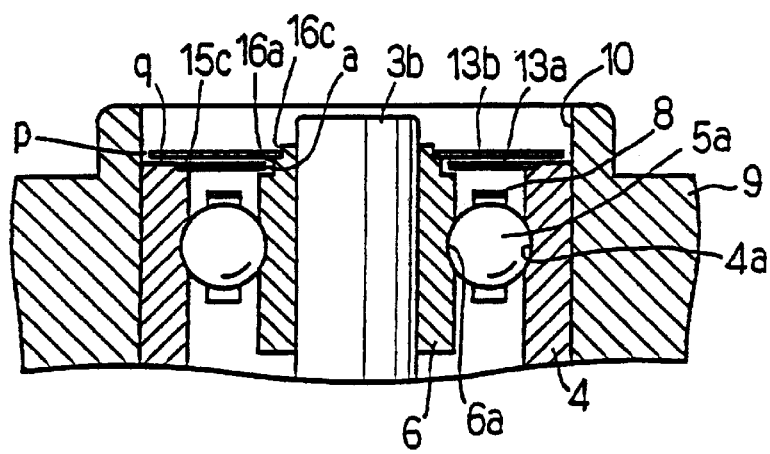
Figure 7:
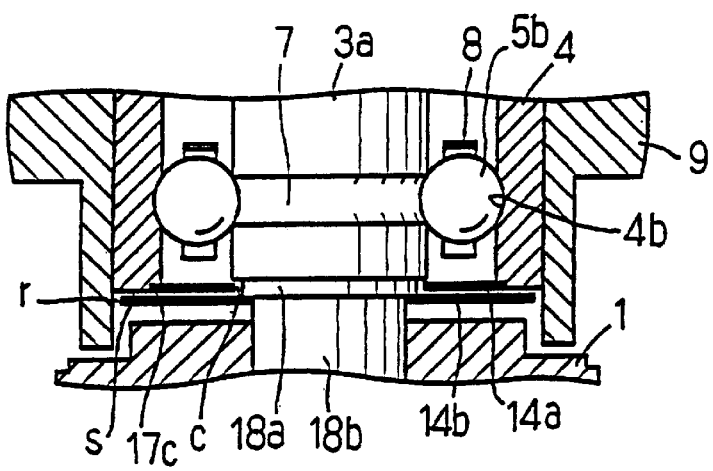

As can be seen from FIG. 7c, at the side of the enlarged diameter shaft portion 3a, the outer peripheral portion of the inner sealing plate 14a is secured with adhesive on the end surface of the shoulder 17c formed on the end surface of the sleeve outer race 4 with remaining a slight clearance (c) between the inner peripheral portion thereof and the outer peripheral surface of the inner shoulder 18a of the enlarged diameter shaft portion 3a to avoid the contact between them to provide the labyrinth seal function.

The inner peripheral portion of the outer sealing plate 14b is secured with adhesive on the outer peripheral surface of the outer shoulder 18b formed around the enlarged diameter shaft portion 3a with remaining a slight clearance (r) between the outer peripheral portion thereof and the inner peripheral surface of the through bore 10 of the rotor hub 9 and with remaining a slight axial clearance (s) between the upper surface thereof and the lower end surface of the sleeve outer race 4 to avoid the contact between them to provide the labyrinth seal function.

Although in the above-mentioned sixth embodiment, the fixing of the sealing plates are adapted to be effected by means of adhesive, the inner sealing plate 13*a* can be press fitted within the recess defined by the shoulder 15*c* of the sleeve outer race 4, the outer sealing plate 13*b* can be press fitted around the outer shoulder 16*b* of the inner race 6, the inner sealing plate 14*a* can be press fitted within the recess defined by the shoulder 17*c* of the sleeve outer race 4, and the outer sealing plate 14*b* can be press fitted around the outer shoulder 18*b* of the enlarged diameter shaft portion 3*a*.

The Eighth Embodiment of the Invention

The eighth embodiment of the present invention will now be described with reference to FIGS. 8*a*, 8*b* and 8*c*. The inner peripheral portion of the inner sealing plate 13*a* is, at the side of reduced diameter shaft portion 3*b*, secured with adhesive to the outer peripheral surface of the inner shoulder 16*a* of the inner race 6 with remaining a slight clearance (e) between the outer peripheral portion thereof and the shoulders 15*c* of the sleeve outer race 4 to avoid the contact between them to provide the labyrinth seal function.

The inner peripheral portion of the outer sealing plate 13*b* is secured with adhesive on the outer shoulder 16*b* of the inner race 6 with remaining a slight clearance (p) between the outer peripheral portion thereof and the inner peripheral surface of the through bore 10 of the rotor hub 9 and with remaining a slight axial clearance (q) between the lower surface thereof and the upper end surface of the sleeve outer race 4 to avoid the contact between them to provide the labyrinth seal function.

Figure 8:
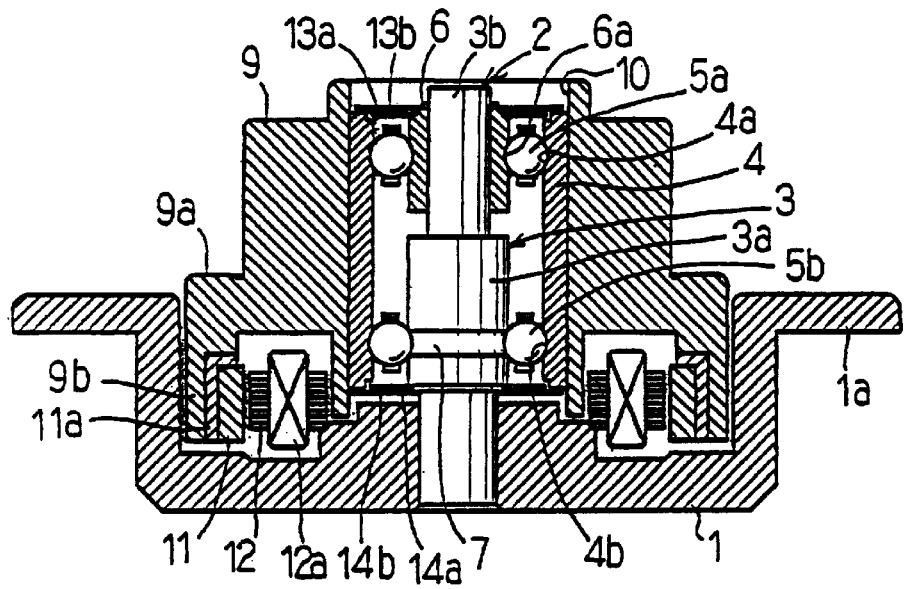
FIG. 8 is a view showing a motor of the eighth embodiment (fixed shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 8:
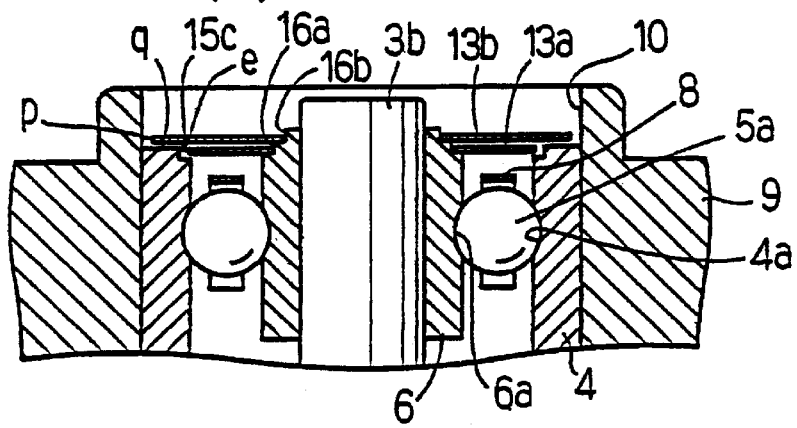
Figure 8:
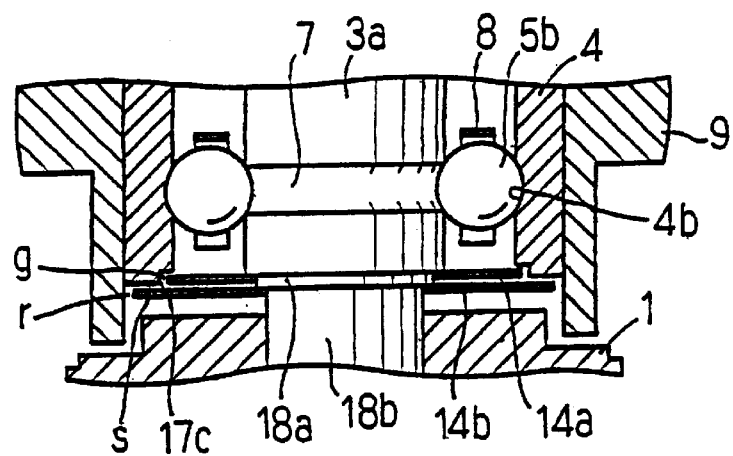

As can be seen from FIG. 8*c*, at the side of the enlarged diameter shaft portion 3*a*, the inner peripheral portion of the inner sealing plate 14*a* is secured with adhesive on the outer peripheral surface of inner shoulder 18*a* of the enlarged diameter shaft portion 3*a* with remaining a slight clearance (g) between the outer peripheral portion thereof and the shoulder 17*c* of the sleeve outer race 4 to avoid the contact between them to provide the labyrinth seal function.

The inner peripheral portion of the outer sealing plate 14*b* is secured with adhesive on the outer peripheral surface of the outer shoulder 18*b* formed around the enlarged diameter shaft portion 3*a* with remaining a slight clearance (r) between the outer peripheral portion thereof and the inner peripheral surface of the through bore 10 of the rotor hub 9 and with remaining a slight axial clearance (s) between the upper surface thereof and the lower end surface of the sleeve outer race 4 to avoid the contact between them to provide the labyrinth seal function.

Although in the above-mentioned eighth embodiment, the fixing of the sealing plates are adapted to be effected by means of adhesive, the inner sealing plate 13*a* can be press fitted around the inner shoulder 16*a* of the inner race 6, the outer sealing plate 13*b* can be press fitted around the outer shoulder 16*b* of the inner race 6, the inner sealing plate 14*a* can be press fitted around the inner shoulder 18*a* of the enlarged diameter shaft portion 3*a*, and the outer sealing plate 14*b* can be press fitted around the outer shoulder 18*b* of the enlarged diameter shaft portion 3*a*.

The Ninth Embodiment of the Invention

Figure 9:
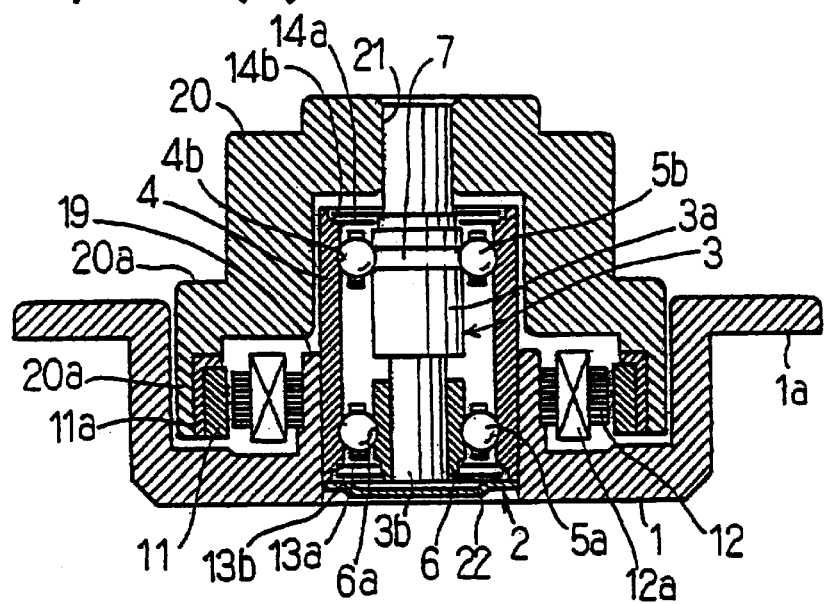
FIG. 9 is a view showing a motor of the ninth embodiment (rotational shaft type) of the present invention, in which (a) illustrates an enlarged sectional view, (b) illustrates a further enlarged sectional view of the upper part of the motor, and (c) illustrates a further enlarged sectional view of the lower part of the motor.
Figure 9:
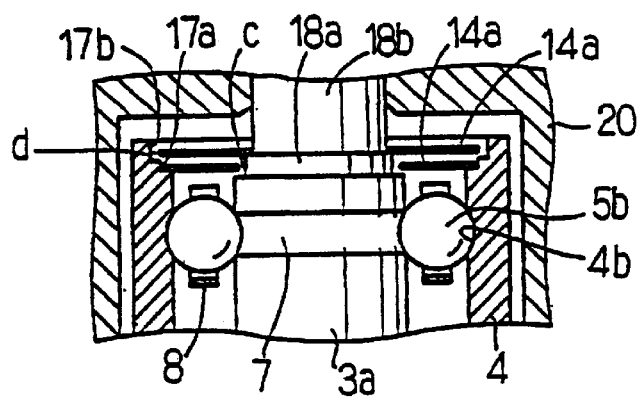
Figure 9:
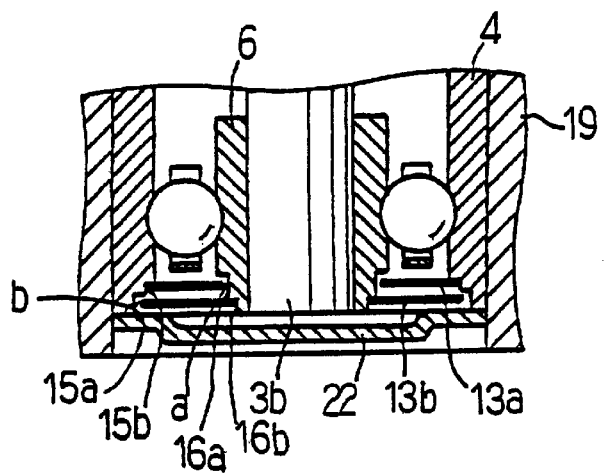

In the above mentioned the first to the eighth embodiments, a motor of the fixed shaft type in which the shaft 3 is secured to the base 1 and the sleeve outer race 4 is secured to the rotor hub 9 are described. On the contrary, the motor of the rotatable shaft type in accordance with the ninth embodiment as shown in FIGS. 9*a*, 9*b* and 9*c* can also be employed.

The motor in accordance with the this embodiment, a cylinder rib 19 is provided on the central portion of a base 1, and the double row bearing apparatus including a sleeve 4 and a shaft 3 is press fitted within the rib in the upside down orientation with respect to the structure of the first to the eighth embodiments so as to direct the reduced diameter shaft portion 3*b* downwardly. The upper end of the enlarged diameter shaft portion is fitted and secured within the vertically extending throughbore 21 of the rotor hub 21.

An outer peripheral portion of the rotor hub 20 is formed with an supporting portion 20*a* on which a magnetic disc is to be loaded and a downwardly depending flange 20*b*. A magnet 11 is attached through a magnet holder 11*a* to an inner surface of the flange 20*b*. An inner peripheral surface of the magnet is faced against the outer peripheral surface of a stator 12 secured to the outer periphery of the cylindrical rib 19 to leave a slight clearance is defined between them.

The structure of the double row bearing apparatus 2 in accordance with this embodiment is substantially the same as that of the first embodiment. The spacing defined at the side of the reduced diameter shaft portion 3*b* (the lower side as shown in FIG. 9*a*) between the lower end portion of the sleeve outer race 4 and the inner race 6 is closed by means of a pair of annular sealing plates 13*a* and 13*b*, and the spacing defined at the side of the enlarged diameter shaft portion 3*a* (the upper side as shown in FIG. 9*a*) between the upper end portion of the sleeve outer race 4 and the outer peripheral surface of the enlarged diameter shaft portion is also closed by means of a pair of annular sealing plates 14*a* and 14*b*.

As can be seen from FIG. 9*b*, at the side of the enlarged diameter shaft portion 3*a*, a pair of shoulders 17*a*, 17*b* are formed on the end surface of the sleeve outer race 4 in a two-stepped manner, and a pair of shoulders 18*a*, 18*b* are formed on the outer peripheral surface of the enlarged diameter shaft portion 3*a* in the same manner. The outer peripheral portion of the inner sealing plate 14*a* is secured with adhesive on the end surface of the inner shoulder 17*a* with remaining a slight clearance (c) between the inner peripheral portion thereof and the outer peripheral surface of the inner shoulder 18*a* to avoid the contact between them to provide the labyrinth seal function.

The inner peripheral portion of the outer sealing plate 14*b* is secured with adhesive on the outer peripheral surface of the outer shoulder 18*b* formed around the enlarged diameter shaft portion 3*a* with remaining a slight clearance (d) between the outer peripheral portion thereof and the outer shoulder 17*b* of the sleeve outer race 4 to avoid the contact between them to provide the labyrinth seal function.

As can be seen from FIG. 9*c*, at the side of reduced diameter shaft portion 3*b*, a pair of shoulders 15*a*, 15*b* are formed on the lower end surface of the sleeve outer race 4 in a two-stepped manner, and a pair of shoulders 16*a*, 16*b* are formed on the lower end portion of the inner race 6 in the same manner. The outer peripheral portion of the inner sealing plate 13*a* is secured with adhesive on the end surface of the inner shoulder 15*a* with remaining a slight clearance (a) between the inner peripheral portion thereof and the outer peripheral surface of the inner shoulder 16*a* to avoid the contact between them to provide the labyrinth seal function.

The inner peripheral portion of the outer sealing plate 13b is secured with adhesive on the outer peripheral surface of the outer shoulder 16b of the inner race 6 with remaining a slight clearance (b) between the outer peripheral portion thereof and the outer shoulder 15b of the sleeve outer race 4 to avoid the contact between them to provide the labyrinth seal function.

The reference numeral 22 is added in FIG. 9a to the lower end covering of the double row bearing apparatus 2.

Although in the above mentioned ninth embodiment, the fixing of the sealing plates are adapted to be achieved by means of adhesive, the inner sealing plate 14a can be press fitted within the recess defined by the inner shoulder 17a of the sleeve outer race 4, the outer sealing plate 14b can be press fitted around the outer shoulder 18b of the enlarged diameter shaft portion 3a, the inner sealing plate 13a can be press fitted within the inner shoulder 15a of the sleeve outer race 4, and the outer sealing plate 13b can be press fitted around the outer shoulder 16b of the inner race 6.

Although in the above-mentioned ninth embodiment, the structure of the sealing apparatus is the same as that of the first embodiment, other sealing means such as those illustrated in the second to the eighth embodiments can also be employed.

Although each of the upper and lower ends of the double row bearing apparatus is provided with a pair of inner and outer sealing plates respectively in the above-mentioned embodiments, a pair of sealing plates may be provided only on one end of the bearing apparatus. In such a case, the opposite end of the bearing apparatus may be provided with one piece of sealing plate of conventional contact type or non-contact type or no piece of sealing plate to make the end remain opened.

Although the double row ball bearing apparatus using balls as rotating bodies of the double row bearing apparatus is illustrated, the roller bearing including rollers as rotating bodies, the needle bearing, and fluid bearing may also be employed.

Instead of the motor of the outer rotor type as described above, the motor of the inner rotor type can also be employed.

The hard disk drive apparatus is accordance with the present invention may be provided with a motor of the structure as described in each of the above-mentioned embodiments. The concrete structure of the hard disk drive apparatus including the motor M of the fixed shaft type (the motor such as that mentioned above) will now be described with reference to FIGS. 10, 11.

A plurality of magnetic discs 23 (e.g. two pieces of magnetic discs :cf. FIG. 11) are provided around the outer periphery of the rotor hub 9 in parallel with each other. Concretely, a plurality of magnetic discs spaced apart with each other by means of a spacer 24 interposed between adjacent discs are loaded on the disc supporting portion 9a and retained thereon by means of disc retainer plate 25 secured to the rotor hub 9 by means of suitable fastening means such as screw.

Figure 10:
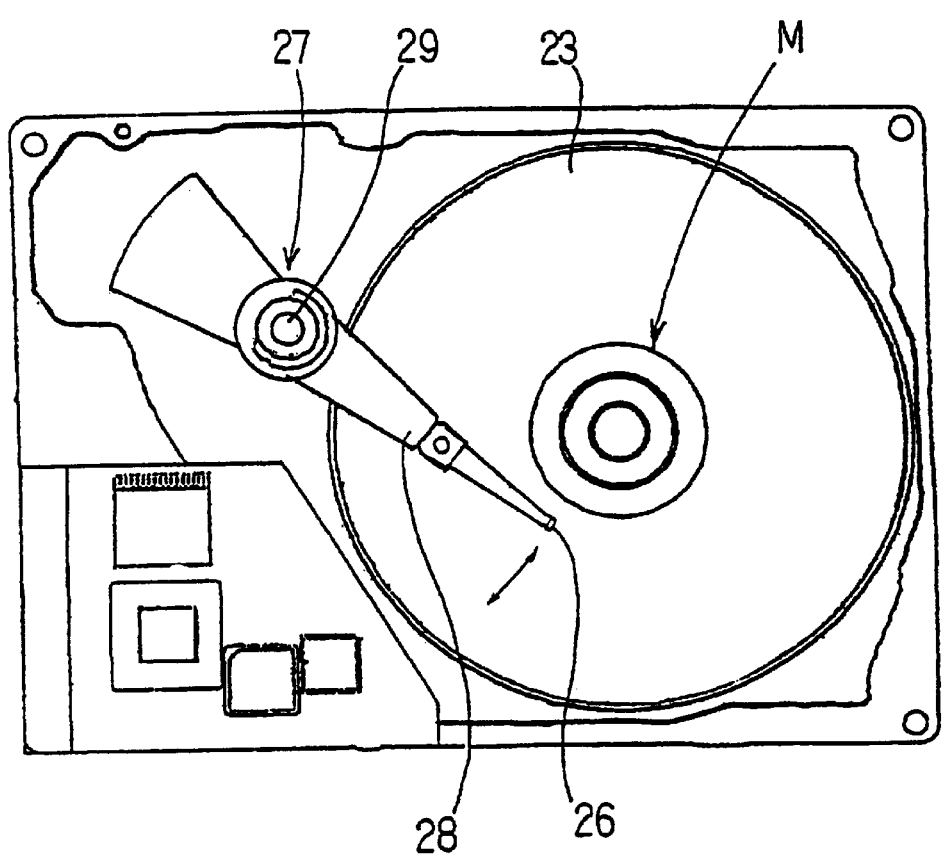
FIG. 10 is a plan view showing a hard disk drive apparatus of the present invention.
Figure 11:
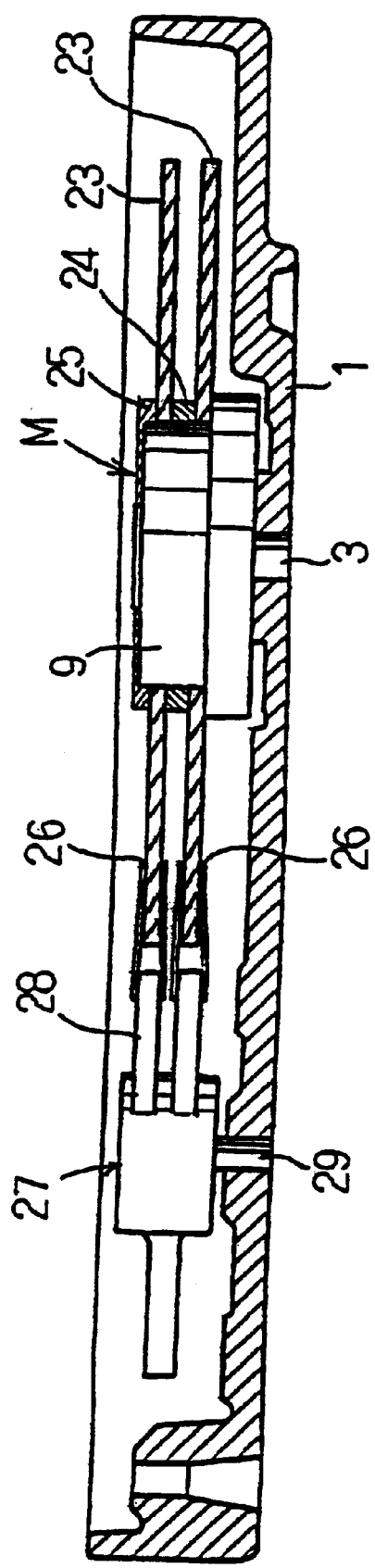
FIG. 11 is a sectional view showing a hard disk drive apparatus of the present invention including a motor of the fixed shaft type.

In FIGS. 10 and 11, a reference numeral 26 is added to a magnetic head for writing or reading magnetic datum into or from the magnetic disk 23. The head 26 is attached to the distal end of a head arm 28 of a swing arm 27. The swing arm 27 is an mechanism for locating the position of the head. The writing or reading of the magnetic datum on the required position on the magnetic disk 23 by means of the head 26 can be effected by swinging the head swing arm 27 about the shaft 29 to bring the head 26 to the required position on the disk 23 and stopped thereabout.

Figure 12:
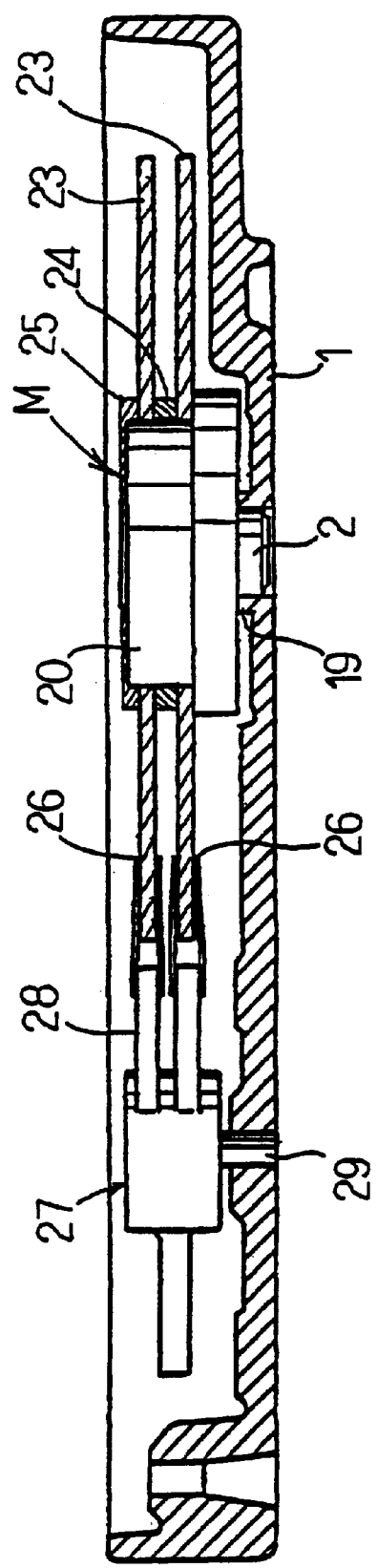
FIG. 12 is a sectional view showing a hard disk drive apparatus of the present invention including a motor of the rotational shaft type.

The hard disk drive apparatus may include the motor M of the rotatable shaft type (the motor such as that of the ninth embodiment) as shown in FIG. 12. The structure of the hard disk apparatus of this alternative embodiment is substantially same as that of the hard disk drive apparatus as shown in FIG. 11 except for the structure of the motor.

The Effects and Advantages of the Invention

In the motor of the present invention, the labyrinth seal structure formed by a pair of sealing plates between the sleeve outer race and the shaft or inner race of the double row bearing apparatus will prohibit the flowing the lubricant out of the bearing apparatus even in the case that the motor is rotated in high speed.

The sealing plates of the non-contact type utilized in the present invention will not produce the frictional torque so that the loss of power of the motor due to friction can be inhibited, the energy required for driving the motor can be reduced, and the energy-saving can be achieved.

Further, the sealing plates of the non-contact type will not produce the heat or particles due to the friction, will not affect the reliability of the equipment to which the motor of the present invention is incorporated, and will not produce the vibration or noise due to friction so that stillness during the operation of the motor can be assured.

The manufacturing of the sealing plate can be effected easily, precisely, and low cost because of its annular disk shaped member. In this connection, the cost for machining and assembling the sealing plates can be reduced.

The labyrinth seal structure incorporated into the double row bearing apparatus will prohibit the necessity of providing the additional labyrinth seal mechanism as effected in the motor of the prior art. In this connection, the cost for machining and the mould can be reduced or eliminated so that the motor of the present invention can be manufactured in low cost.

In accordance with the present invention, the flowing of the lubricant out from the bearing apparatus of the motor can be inhibited, so that there are almost no possibility of the crushing of the magnetic head due to the lubricant, and the production of the frictional heat, frictional particles, and vibration and noise can also be prohibited. Thus the reliability and the stillness of the hard disk drive apparatus can be assured.

While particular embodiments of the present invention have been illustrated and described, it should be obvious to those skilled in the art that various changes and modifications can be made without departing from the spirit and scope of the invention.

What is claimed is:

1. A motor including a double row bearing apparatus for supporting a rotor hub rotatably on a base characterized in that: the double row bearing apparatus includes;

a two-stepped shaft having an enlarged diameter shaft portion and a reduced shaft portion, a sleeve outer race disposed around the shaft through a pair of first and second rows of rotating bodies interposed between the shaft and the sleeve, outer race, rotating bodies for the first row are adapted to be interposed between an outer peripheral rolling contact groove formed directly on the outer peripheral surface of the enlarged diameter shaft portion of the stepped shaft and a first inner peripheral rolling contact groove formed on the inner peripheral surface of the sleeve outer race, rotating bodies for the second row are adapted to be interposed between an outer peripheral rolling contact groove formed on an outer peripheral surface of an inner race fitted around the reduced shaft portion of the stepped shaft and a second inner peripheral rolling contact groove formed on the inner peripheral surface of the sleeve outer race, at the side of the first row of the rotating bodies, inner and outer annular sealing plates are provided to leave a slight clearance between the inner or outer peripheral surface of each sealing plate and the outer peripheral surface of the enlarged diameter shaft portion or the end portion of the sleeve outer race to provide a labyrinth seal on one side of the sleeve outer race, and at the side of the second row of rotating bodies, inner and outer annular sealing plates are provided to leave a slight clearance between the inner or outer peripheral surface of each sealing plate and the inner race or the end portion of the sleeve outer race to provide a labyrinth seal on the other side of the sleeve outer race.

2. A motor as claimed in claim 1, wherein at the side of said first row of the rotating bodice, inner and outer shoulders are formed on the end portion of the sleeve outer race in a two-stepped manner, and inner and outer shoulders are also provided on the outer peripheral surface of the enlarged diameter shaft portion of the stepped shaft in the same manner be to opposite to the inner and outer shoulders of the sleeve outer race, and inner sealing plate is attached to either of said inner shoulder of the sleeve outer race or the shaft with remaining a slight clearance between the plate and the shaft or the sleeve outer race to provide the labyrinth seal function, and said outer sealing plate is attached to either of said outer shoulder of the sleeve outer race or the shaft with remaining a slight clearance between the plate and the shaft or the sleeve outer race to provide the labyrinth seal function.

3. A motor as claimed in claim 1, wherein at the side of said second row of the rotating bodies, inner and outer shoulders are provided on the end surface of the sleeve outer race in a two-stepped manner, and inner and outer shoulders are also provided on the end portion of the inner race in the same manner so as to be opposite to the inner and outer shoulders of the sleeve outer race, said inner sealing plate is attached to said inner shoulder of either of the sleeve outer race or the inner race with remaining a slight clearance between the plate and the inner race or the sleeve outer race to provide the labyrinth seal function, and said outer sealing plate is attached to said outer shoulder of either of the sleeve outer race or the inner race with remaining a slight clearance between the plate and the inner race or the sleeve outer race to provide a labyrinth seal.

4. A motor as claimed in claim 1, wherein at the side of said first row of the rotating bodies, a one step shoulder is formed on the end surface of the sleeve outer race, and an inner shoulder is provided on the outer peripheral surface of the enlarged diameter shaft portion of said stepped shaft be to opposite to the shoulder of the sleeve outer race, an outer shoulder is also provided on the shaft to form it as a two stepped shaft, said inner sealing plate is attached to either of said shoulder of the sleeve outer race or the inner shoulder of the shaft with remaining a slight clearance between the plate and the shaft or the sleeve outer race to provide the labyrinth seal function, and said outer sealing plate is attached to said outer shoulder with remaining a slight axial clearance between the plate and the end surface of the sleeve outer race to provide the labyrinth seal function.

5. A motor as claimed in claim 1, wherein at the side of said second row of the rotating bodies, inner and outer shoulders are formed on the end surface of the sleeve outer race in a two-stepped manner, and a one step shoulder is also formed on the end portion of the inner race so as to be opposite to the inner shoulder of the sleeve outer race, said inner sealing plate is attached to either of said inner shoulder of the sleeve outer race or the shoulder of the inner race with remaining a slight clearance between the plate and the inner race or the sleeve outer race to provide the labyrinth seal function, and said outer sealing plate is attached to said outer shoulder of the sleeve outer race with remaining a slight axial clearance between the plate and the end surface of the inner race to provide the labyrinth seal function.

6. A motor as claimed in claim 1, wherein at the side of said second row of the rotating bodies, a shoulder is provided on the end surface of the sleeve outer race, and an inner shoulder is provided on the end portion of the inner race to be opposite to the shoulder of the sleeve outer race, an outer shoulder is also provided on the inner race to form a two-stepped shoulder, said inner sealing plate is attached to either of said shoulder of the sleeve outer race or the inner shoulder of the inner race with remaining a slight clearance between the plate and either of the inner race or the sleeve outer race to provide the labyrinth seal function, and said outer sealing plate is attached to said outer shoulder of the inner race with remaining a slight axial clearance between the plate and the end surface of the sleeve outer race to provide the labyrinth seal function.

7. A motor as claimed in claim 1, wherein the stepped shaft of said double row bearing apparatus is secured to said base to extend vertically therefrom, and a vertically extending bore of the rotor hub is fitted around the sleeve outer race.

8. A motor as claimed in claim 1, wherein a vertically extending cylindrical portion including a through bore is provided on the central portion of the base, the sleeve outer race of said double row bearing apparatus is fitted into the bore, and the stepped shaft of said double row bearing apparatus is fitted into a vertical bore provided through the central portion of the rotor hub.

9. A hard disk drive apparatus comprising:
a motor including a double row bearing apparatus for supporting a rotor hub rotatably on a base,
a magnetic disk loaded on the outer peripheral surface the rotor hub,
a magnetic head for writing or reading magnetic datum onto or from the magnetic disk,
a positioning mechanism for moving the head to bring it to the required radial position on the disk and stopped thereabove,
the double row bearing apparatus of the motor including;
a two-stepped shaft having an enlarged diameter shaft portion and a reduced shaft portion,
a sleeve outer race disposed around the shaft through a pair of first and second rows of rotating bodies interposed between the shaft and the sleeve,
rotating bodies for the first row are adapted to be interposed between an outer peripheral rolling contact groove formed directly on the outer peripheral surface of the enlarged diameter shaft portion of the stepped shaft and a first inner peripheral rolling contact groove formed on the inner peripheral surface of the sleeve outer race,
rotating bodies for the second row are adapted to be interposed between an outer peripheral rolling contact groove formed on an outer peripheral surface of an inner race fitted around the reduced shaft portion of the stepped shaft and a second inner peripheral rolling contact groove formed on the inner peripheral surface of the sleeve outer race, at the side of the first row of the rotating bodies, inner and outer annular sealing plates are provided to leave a slight clearance between the inner or outer peripheral surface of each sealing plate and the outer peripheral surface of the enlarged diameter shaft portion or the end portion of the sleeve outer race to provide a labyrinth seal on one side of the sleeve outer race, and at the side of the second row of rotating bodies, inner and outer annular sealing plates are provided to leave a slight clearance between the inner or outer peripheral surface of each sealing plate and the inner race or the end portion of the sleeve outer race to provide a labyrinth seal on the other side of the sleeve outer race.

10. A hard disk drive apparatus as claimed in claim 9, wherein the double row bearing apparatus of the motor including at the side of said first row of the rotating bodies, inner and outer shoulders formed on the end portion of the sleeve outer race in a two-stepped manner, and inner and outer shoulders provided also on the outer peripheral surface of the enlarged diameter shaft portion of the stepped shaft in the same manner so as to be opposite to the inner and outer shoulders of the sleeve outer race, wherein said inner sealing plate is attached to either of said inner shoulder of the sleeve outer race or the shaft with remaining a slight clearance between the plate and the shaft or the sleeve outer race to provide the labyrinth seal function, and said outer sealing plate is attached to either of said outer shoulder of the sleeve outer race or the shaft with remaining a slight clearance between the plate and the shaft or the sleeve outer race to provide the labyrinth seal function.

11. A hard disk drive apparatus as claimed in claim 9, wherein the double row bearing apparatus of the motor including at the side of said second row of the rotating bodies, inner and outer shoulders provided on the end surface of the sleeve outer race in a two-stepped manner, and inner and outer shoulders provided also on the end portion of the inner race in the same manner so as to be opposite to the inner and outer shoulders of the sleeve outer race, wherein said inner sealing plate is attached to said inner shoulder of either of the sleeve outer race or the inner race with remaining a slight clearance between the plate and the inner race or the sleeve outer race to provide the labyrinth seal function, and said outer sealing plate is attached to said outer shoulder of either of the sleeve outer race or the inner race with remaining a slight clearance between the plate and the inner race or the sleeve outer race to provide a labyrinth seal.

12. A hard disk drive apparatus as claimed in claim 9, wherein the double row boaring apparatus of the motor including at the side of said first row of the rotating bodies, a one step shoulder formed on the end surface of the sleeve outer race, and an inner shoulder provided on the outer peripheral surface of the enlarged diameter shaft portion of said stepped shaft to opposite to the shoulder of the sleeve outer race, an outer shoulder provided also on the shaft to be form it as a two stepped shaft, wherein said inner sealing plate is attached to either of said shoulder of the sleeve outer race or the inner shoulder of the shaft with remaining a slight clearance between the plate and the shaft or the sleeve outer race to provide the labyrinth seal function, and said outer sealing plate is attached to said outer shoulder with remaining a slight axial clearance between the plate and the end surface of the sleeve outer race to provide the labyrinth seal function.

13. A hard disk drive apparatus as claimed in claim 9, wherein the double row bearing apparatus of the motor including at the side of said second row of the rotating bodies, inner and outer shoulders formed on the end surface of the sleeve outer race in a two-stepped manner, and a one step shoulder formed also on the end portion of the inner race so as to be opposite to the inner shoulder of the sleeve outer race, wherein said inner sealing plate is attached to either of said inner shoulder of the sleeve outer race or the shoulder of the inner race with remaining a slight clearance between the plate and the inner race or the sleeve outer race to provide the labyrinth seal function, and said outer sealing plate is attached to said outer shoulder of the sleeve outer race with remaining a slight axial clearance between the plate and the end surface of the inner race to provide the labyrinth seal function.

14. A hard disk drive apparatus as claimed in claim 9, wherein the double row bearing apparatus of the motor including at the side of said second row of the rotating bodies, a shoulder provided on the end surface of the sleeve outer race, and an inner shoulder provided on the end portion of the inner race to be opposite to the shoulder of the sleeve outer race, an outer shoulder provided also on the inner race to form a two-stepped shoulder, wherein said inner sealing plate is attached to either of said shoulder of the sleeve outer race or the inner shoulder of the inner race with remaining a slight clearance between the plate and either of the inner race or the sleeve outer race to provide the labyrinth seal function, and said outer sealing plate is attached to said outer shoulder of the inner race with remaining a slight axial clearance between the plate and the end surface of the sleeve outer race to provide the labyrinth seal function.

15. A hard disk drive apparatus as claimed in claim 9, wherein said motor including the stepped shaft of said double row bearing apparatus is secured to said base to extend vertically therefrom, and a vertically extending bore of the rotor hub is fitted around the sleeve outer race.

16. A hard disk drive apparatus as claimed in claim 9, wherein said motor including a vertically extending cylindrical portion including a through bore is provided on the central portion of the base, the sleeve outer race of said double row bearing apparatus is fitted into the bore, and the stepped shaft of said double row bearing apparatus is fitted into a vertical bore provided through the central portion of the rotor hub.

* * * * *